US011885446B2

United States Patent
Dings

(10) Patent No.: US 11,885,446 B2
(45) Date of Patent: Jan. 30, 2024

(54) ARRANGEMENT

(71) Applicant: Siemens Aktiengesellschaft, Munich (DE)

(72) Inventor: Markus Dings, Bruggen (DE)

(73) Assignee: Siemens Aktiengesellschaft, Munich (DE)

( * ) Notice: Subject to any disclaimer, the term of this patent is extended or adjusted under 35 U.S.C. 154(b) by 114 days.

(21) Appl. No.: 17/609,379

(22) PCT Filed: Apr. 22, 2020

(86) PCT No.: PCT/EP2020/061142
§ 371 (c)(1),
(2) Date: Nov. 6, 2021

(87) PCT Pub. No.: WO2020/233926
PCT Pub. Date: Nov. 26, 2020

(65) Prior Publication Data
US 2022/0213992 A1 Jul. 7, 2022

(30) Foreign Application Priority Data
May 23, 2019 (EP) .................................... 19176103

(51) Int. Cl.
*F16L 23/08* (2006.01)
*F16L 23/18* (2006.01)

(52) U.S. Cl.
CPC .................................. *F16L 23/18* (2013.01)

(58) Field of Classification Search
CPC ........ F16J 15/022; F16J 15/061; F16J 15/104; F16L 23/18; F16L 23/22
See application file for complete search history.

(56) References Cited

U.S. PATENT DOCUMENTS

| 4,318,548 A | * | 3/1982 | Oberle | ..................... F16L 49/04 |
| | | | | 285/334.4 |
| 7,490,868 B2 | * | 2/2009 | Prestridge | ............... F16L 23/18 |
| | | | | 285/332.1 |

(Continued)

FOREIGN PATENT DOCUMENTS

| CN | 2764979 Y | 3/2006 |
| CN | 203743426 U | 7/2014 |

(Continued)

OTHER PUBLICATIONS

PCT International Search Report and Written Opinion of International Searching Authority dated Jul. 29, 2020 corresponding to PCT International Application No. PCT/EP2020/061142 filed Apr. 22, 2020.

*Primary Examiner* — Nicholas L Foster
(74) *Attorney, Agent, or Firm* — Wolter Van Dyke Davis, PLLC

(57) ABSTRACT

An arrangement for equalizing an offset between two pipe flanges, includes an arrangement for equalizing an offset between two pipe flanges, having adjustment rings, each having a recess which extends along an axis and about which a ring material extends in a circumferential direction, wherein at least two of the adjustment rings have two contact surfaces, the contact surfaces having flat, substantially circular contact surfaces at least along circular tracks concentric to the axis. A cross section of the ring material has a varying axial ring material thickness in the circumferential direction such that at least two of the adjustment rings have a wedge shape having an angular offset of the two contact surfaces relative to each other. The arrangement has at least three adjustment rings to flexibly compensate for different offset phenomena.

12 Claims, 3 Drawing Sheets

(56) References Cited

U.S. PATENT DOCUMENTS

| | | | |
|---|---|---|---|
| 10,082,419 B1 | 9/2018 | Eckert | |
| 2007/0267868 A1 | 11/2007 | Holzheu | |
| 2008/0012319 A1* | 1/2008 | Prestridge | F16L 27/04 |
| | | | 285/332.1 |
| 2011/0138730 A1 | 6/2011 | Nies | |
| 2023/0082967 A1* | 3/2023 | Luo | E21B 43/2607 |
| | | | 285/405 |

FOREIGN PATENT DOCUMENTS

| | | |
|---|---|---|
| CN | 106255847 A | 12/2016 |
| DE | 102012102821 A1 | 10/2013 |
| EP | 2708659 A2 | 3/2014 |
| FR | 1591118 A | 4/1970 |
| FR | 2627841 A1 | 9/1989 |
| RU | 2330209 C2 | 7/2008 |
| RU | 2597628 C1 | 9/2016 |
| RU | 2633615 C2 | 10/2017 |
| SU | 663946 A1 | 5/1979 |
| SU | 1216537 A1 | 3/1986 |

\* cited by examiner

ARRANGEMENT

CROSS REFERENCE TO RELATED APPLICATIONS

This application is the US National Stage of International Application No. PCT/EP2020/061142 filed 22 Apr. 2020, and claims the benefit thereof. The International Application claims the benefit of European Application No. EP19176103 filed 23 May 2019. All of the applications are incorporated by reference herein in their entirety.

FIELD OF INVENTION

The invention relates to an arrangement for the compensation of an offset between two pipe flanges comprising: adapting rings which in each case have a recess which extends along an axis and around which a ring material extends along a circumferential direction, the adapting rings in each case having two bearing faces, the bearing faces having planar substantially circularly annular bearing faces at least along circular paths which are concentric with respect to the axis, a cross section of the ring material along the circumferential direction having a changing axial ring material thickness in such a way that at least two of the adapting rings have a wedge shape with an angular offset of the two bearing faces with respect to one another.

BACKGROUND OF INVENTION

Flanges in the context of the invention are also called pipeline flanges. If statements are made in the present text about flanges, exclusively pipeline flanges are meant. Flanges serve for the sealed, releasable connection of pipe sections. The contact pressure, applied by means of flange screws, of the circularly annular sealing faces of the flanges on a seal which possibly lies in between is decisive for tightness. The screws extend through bores in the flanges and what are known as the flange sheets. As a constituent part of the pipeline, flanges are as a rule welded to a pipe end. Flanges can also be provided on connector components. Various flanges of different metal materials are described, inter alia, in: EN 1092-1, EN 1092-2, EN 1092-3, EN 1092-4.

A spatial offset of the flanges to be joined together, for example on account of welding distortion, occurs frequently during the production of pipelines and the installation of connected machines.

The compensation of an offset of this type conventionally requires complicated reworking or adaptation work on site under as a rule poor conditions, in particular without suitable machine tools.

SUMMARY OF INVENTION

It is the object of the invention to simplify said work.

In order for it to be possible for different types of offset phenomena between flanges to be compensated for simply in a flexible manner, an arrangement as claimed is proposed according to the invention in order to achieve the object. Furthermore, a method for the assembly of an arrangement of this type is proposed.

The individual adapting rings are configured in such a way that at least three of the adapting rings have a wedge shape with an angular offset of the two bearing faces with respect to one another. In other words, at least three of the adapting rings have two substantially circularly annular bearing faces which point with a respective surface perpendicular substantially in the direction of the axis, a cross section of the ring material along the circumferential direction having a changing axial ring material thickness in such a way that the two surface perpendiculars have an angular offset with respect to one another.

The two bearing faces have planar substantially circularly annular bearing faces at least along circular paths which are concentric with respect to the axis, in order that the adapting rings can be turned with respect to one another during the assembly about the axis of the extent of the recess. Accordingly, the bearing faces can be of completely planar configuration or can have elevations or grooves which extend along the concentric circular paths. Radial centering of the adapting rings with respect to one another is conceivable by means of said elevations, grooves or recesses.

The use according to the invention of at least three, advantageously at least four, adapting rings makes a compensation of an offset possible, which offset can be a combination of an axial offset, an angular offset and a parallel offset or only a single offset type of the listed offset types.

One advantageous development of the invention provides that the wedge angle for the wedge-shaped adapting rings is between <2° and 6° (the angle is dependent on the nominal width and should be selected in accordance with the axial tolerance to be corrected). A wedge shape of this type makes the compensation of most of the offset phenomena which occur on site possible. A further advantageous development provides that the wedge-shaped adapting rings in each case have a minimum axial ring material thickness and have a maximum axial ring material thickness, the following applying in the case of a mean internal diameter: 0.005<((difference of the ring material thicknesses)/internal diameter) <1.025.

Another advantageous development of the invention provides that at least some, advantageously all, of the adapting rings are connected among one another in an integrally joined manner, in particular by means of an adhesive bond. A suitable adhesive to this end is, for example, silicone. Seal materials can vary from a separate seal by means of O-ring or round cord via rubber coating of the ring as far as the adhesive bond as described above.

The arrangement according to the invention is particularly suitable for filling an offset in a bridging manner between two flanges which lie with a flange sealing face substantially opposite one another. In particular, in the case of the offset between the offset sealing faces with respect to one another, it can be an angular offset between 0.05° and 8° (depending on the nominal width of the flanges and/or the permissible tolerances of the pipelines). An axial spacing between the flanges or the flange sealing faces can be greater than 1 mm. There are advantageously four adapting rings between the two flange sealing faces, but only three adapting rings can also be used depending on the axial spacing and the angular offset. In addition to or instead of the angular offset, the offset between the two flange sealing faces can also be configured as a parallel offset. Here, the adapting rings are turned about the axis with respect to one another in such a way that the adapting rings fill or compensate for the offset between the flange sealing faces.

Moreover, the invention provides a method for compensating for an offset between two pipe flanges, comprising flange sealing faces, by means of an arrangement as claimed in at least one of the apparatus claims.

To this end, the method provides the following steps: a) orienting of the pipe flanges with at least three adapting rings which are arranged between the flange sealing faces, b) turning of the adapting rings about the axis with respect to one another into a joining position in such a way that those bearing faces of the adapting rings which in each case lie directly opposite the flange sealing faces are oriented substantially parallel to the respective opposite flange sealing face, and the adapting rings which are arranged in each case adjacently with respect to the flange sealing faces are arranged with the recess which extends along the axis in each case substantially concentrically with respect to the adjacent pipe flange, c) integrally joined joining of the adapting rings in the joining position or by means of separate seal and positively locking marking by means of, for example, grained structure, d) final assembling of the two pipe flanges to form a flange connection with arranging of the adapting rings between the two flange sealing faces.

Moreover, one advantageous development of the method according to the invention provides that the following step takes place after the turning and before the integrally joined joining: b1) checking of the absence of stress of the arrangement with the adapting rings.

Furthermore, the following additional step can take place: b2) marking of the relative circumferential position of the adapting rings with respect to one another in the joining position.

Moreover, the further step can advantageously also take place: b3) removing of the adapting rings out of the arrangement between the flange sealing faces.

BRIEF DESCRIPTION OF THE DRAWINGS

In the following text, the invention is described in greater detail on the basis of specific exemplary embodiments with reference to drawings, in which.

DETAILED DESCRIPTION OF INVENTION

Figure 1:
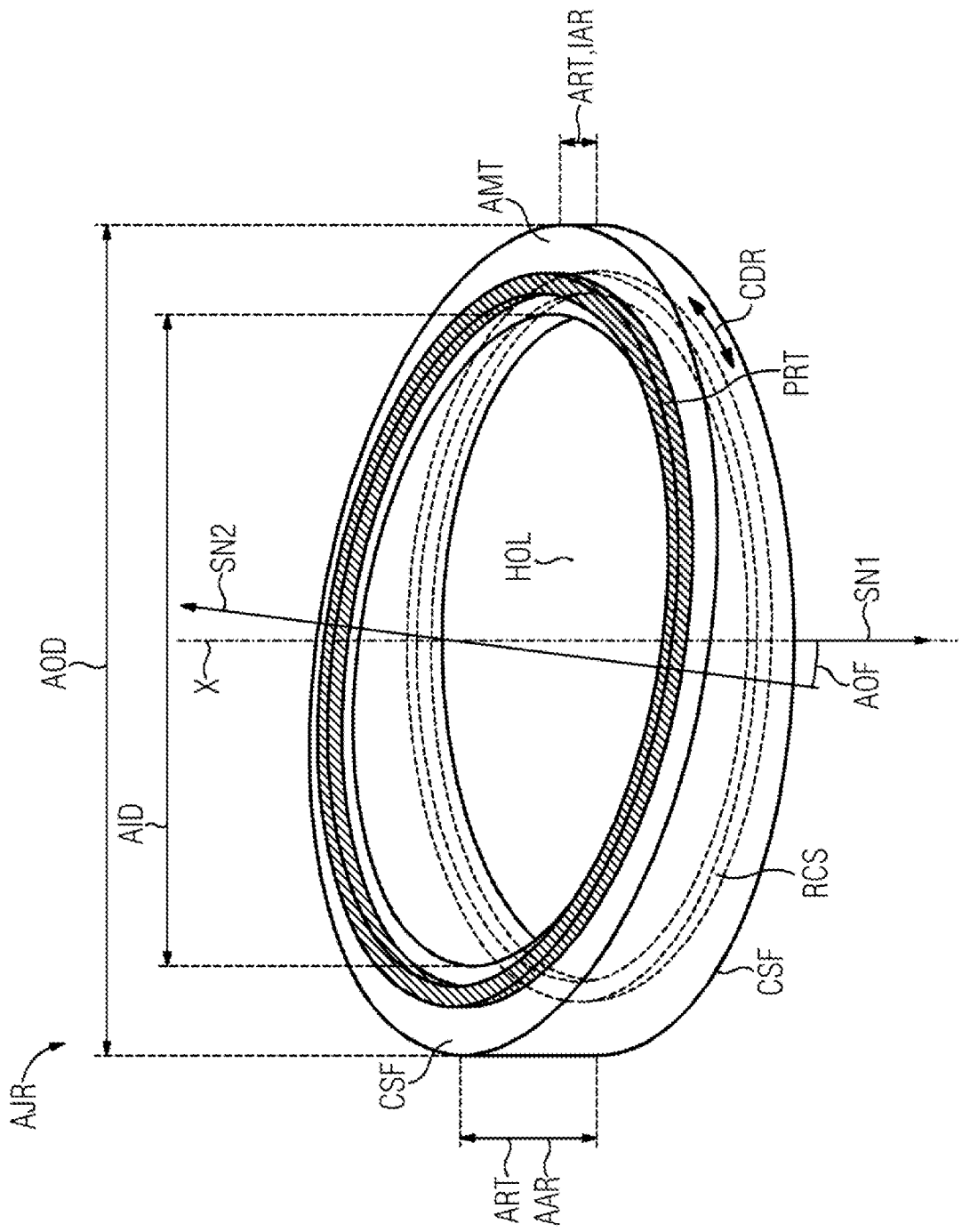
FIG. 1 shows a diagrammatic three-dimensional illustration of an adapting ring according to the invention, FIGS. 2-4 in each case show a diagrammatic two-dimensional illustration of a side view of the various configurations of the adapting rings between two flanges which lie opposite one another.
Figure 2:
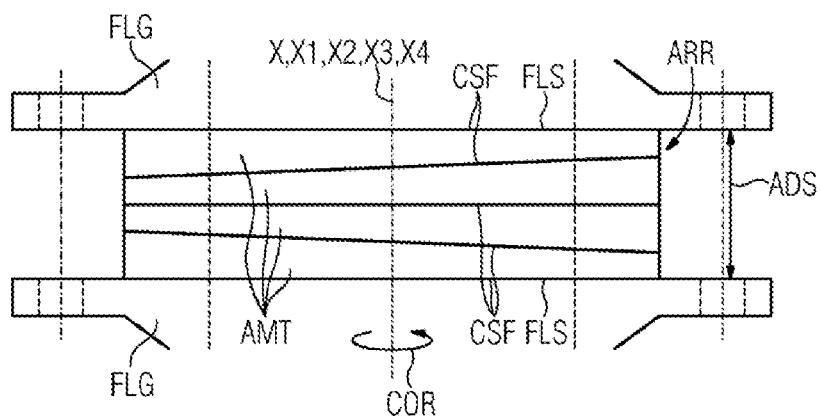
Figure 3:
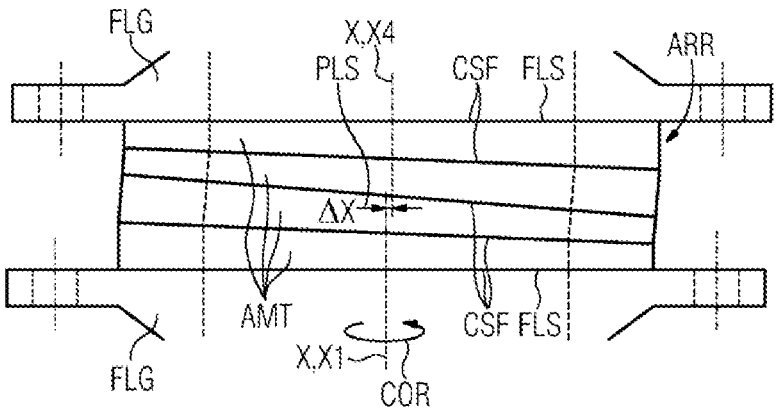
Figure 4:
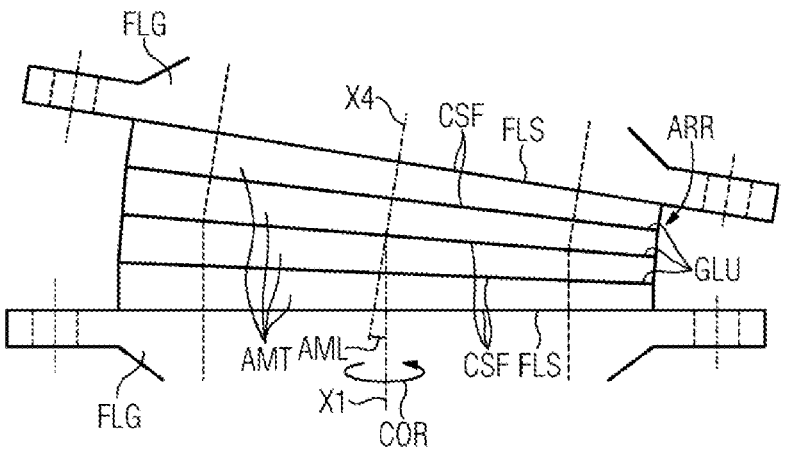
Figure 5:
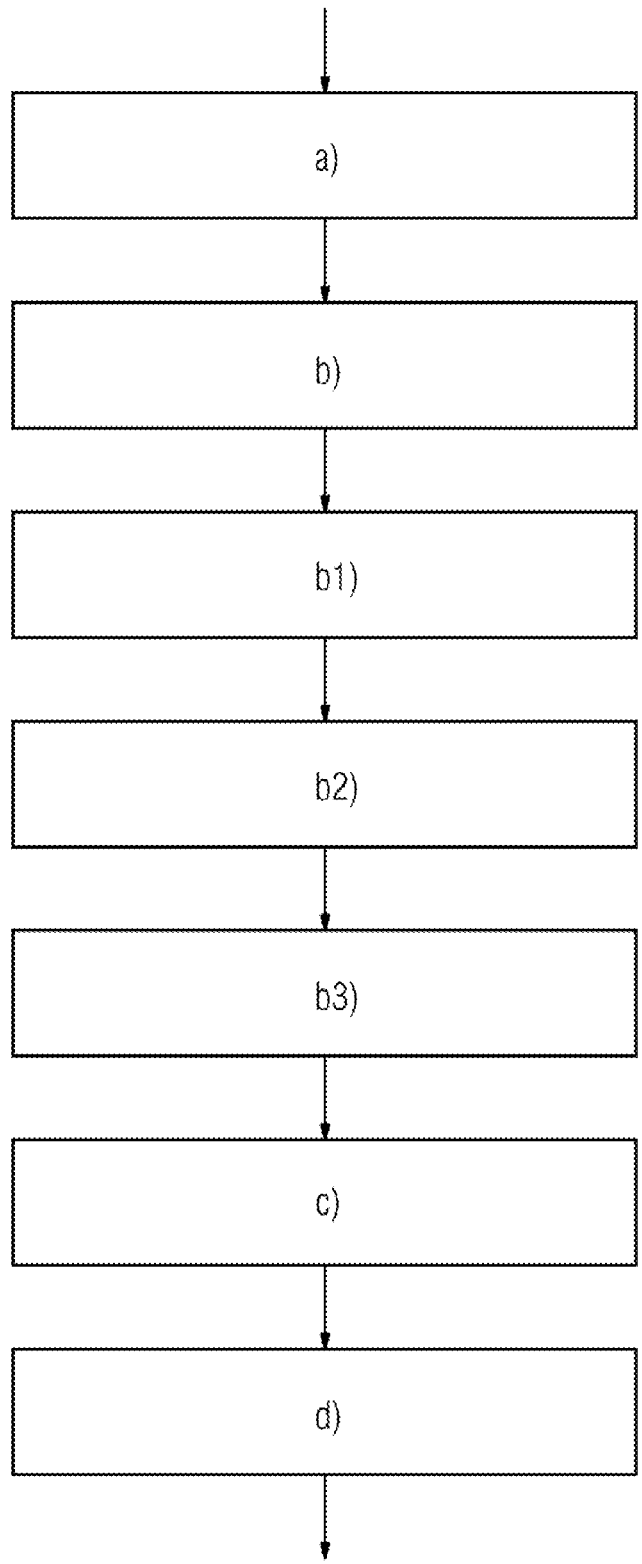
FIG. 5 shows a diagrammatic flow chart for illustrating the method according to the invention.

FIG. 1 shows a diagrammatic three-dimensional illustration of an adapting ring AJR. FIGS. 2-4 in each case show a lateral diagrammatic illustration of an arrangement ARR comprising in each case four adapting rings AJR between in each case two flanges FLG which lie with a flange sealing face FLS substantially opposite one another. FIG. 5 shows a diagrammatic flow chart of a method for assembling an arrangement ARR according to the invention.

The adapting ring AJR which is shown in FIG. 1 is provided for the compensation of an offset OFT between two pipe flanges FLG, as shown in FIGS. 2-4. The adapting ring AJR has a recess HOL which extends along an axis X and around which a ring material AMT extends along a circumferential direction CDR. The adapting ring AJR has two bearing faces CSF on both sides on the axial end side. The bearing faces CSF are configured at least along circular paths which are concentric with respect to the axis X as a plane and substantially circularly annular bearing faces CSF. A cross section of the ring material AMT along the circumferential direction CDR has a changing axial ring material thickness ART. As a result, the adapting ring AJR is of wedge-shaped configuration, and the two bearing faces CSF are not parallel to one another, but have an angular offset AOF. For clarification, surface perpendiculars SN1, SN2 are also illustrated for the respective bearing faces CSF in FIG. 1, which surface perpendiculars SN1, SN2 point substantially in the direction of the axis on one side (the first surface perpendicular SN1 is parallel to the axis X), the second surface perpendicular SN2 having an angular offset AOF with respect to the first surface perpendicular SN1 and with respect to the axis X. Shown here optionally, the adapting ring AJR has, on the upwardly pointing bearing face CSF, a projection PRT which extends in a circularly annular manner on the bearing face and can be brought into engagement with a corresponding circularly annular cutout RCS of an adjacent adapting ring AJR (is shown here by means of dashed lines as a concealed contour and optionally in FIG. 1), with the result that a radial relative offset between two adjacent adapting rings is not possible. This relative offset block is merely optional and is also provided only for adapting rings AJR which do not come into contact by way of the corresponding bearing face CSF with a flange seal face FLS. As an alternative or in addition to said positively locking movement restriction in a relative manner between two adapting rings AJR, an integrally joined connection between two adjacent adapting rings AJR is provided, in the manner of an adhesive bond GLU, for example by means of silicone. Seals or materials for sealing can be provided depending on requirements between the individual adapting rings AJR and/or between the adapting rings AJR and the flange seal faces FLS. The wedge angle AOS or the angular offset AOS between the two surface perpendiculars SN1, SN2 is between 2° and 6° for at least some wedge-shaped adapting rings AJR. All of the wedge-shaped adapting rings AJR of the arrangement ARR are advantageously configured with identical wedge angles.

The wedge-shaped adapting rings AJR in each case have a minimum axial ring material thickness IAR and a maximum axial ring material thickness AAR. In addition, the wedge-shaped adapting rings AJR have a mean internal diameter AID and a mean external diameter AOD. The following applies to a relationship between the ring material thicknesses IAR, AAR and the mean internal diameter AID: $0.005 < (AAR-IAR)/AID < 1.025$.

Furthermore, the following applies to the ratio of the mean external diameter AOD and the mean internal diameter AID: $1.002 < AOD/AID < 1.2$ depending on the respective flange sealing face ratio.

FIG. 2 shows the case where the two flange sealing faces FLS of the two flanges FLG which lie opposite one another are at merely an axial spacing ADS from one another. Accordingly, the wedge-shaped adapting rings AJR are turned with respect to one another in such a way that the respective wedge angle AOF is compensated for by the adjacent adapting rings AJR. Accordingly, all the axes of extent X1, X2, X3, X4 of the involved adapting rings AJR coincide with the central axis X.

FIG. 3 shows a parallel offset PLS of the two flanges FLG which lie opposite one another or the flange seal faces FLS. The parallel offset PLS is compensated for by means of the adapting rings AJR by virtue of the fact that the four adapting rings are oriented in each case in groups of two with an identical circumferential position of the maximum axial ring thickness AAR. In this way, an angular offset of the end-side bearing faces of the group of two is caused. A second group of two with a likewise identical circumferential orientation of the two adapting rings AJR is arranged with an opposed orientation in the circumferential direction with respect to the first group. As a result, the angular offset of the total of four adapting rings AJR is compensated for. Merely a parallel offset PLS which corresponds to the compensation requirements of the arrangement ARR remains.

FIG. 4 shows a situation, in the case of which the flanges FLG which lie opposite one another also have an angular offset AOF in addition to the axial offset ADS. The angular offset is compensated for by means of the four adapting rings AJR, by the circumferential position of the four adapting rings AJR being identical, with the result that the circumferential position with the maximum axial ring thickness ART coincides in each case. These three basic cases are superimposed with one another in a real assembly situation in such a way that the combination of axial offset or axial spacing ADS, angular offset AOF and parallel offset PLS is compensated for in each case within the limits of the wedge shape of the adapting rings by means of turning of the individual adapting rings AJR until the offset situation is compensated for.

FIG. 5 shows a flow chart which represents the method for the compensation of an offset OFT between two pipe flanges FLG.

In a first step a), an orientation of the pipe flanges FLG takes place with at least three adapting rings AJR, advantageously with four adapting rings AJR, which are arranged between the flange sealing faces FLS.

In a second step b), turning of the adapting rings AJR about the axis X with respect to one another into a joining position follows in such a way that those bearing faces of the adapting rings AJR which in each case lie directly opposite the flange sealing faces FLS are oriented substantially parallel to the respective opposite flange sealing face FLS, and the adapting rings AJR which are arranged in each case adjacently with respect to the flange sealing faces FLS are arranged with the recess HOL which extends along the axis X in each case essentially concentrically with respect to the adjacent pipe flange FLG.

In an optional sub-step of step b) (called b1) here), the optional checking of the absence of stress of the arrangement ARR with the adapting rings AJR takes place. In a likewise optional sub-step b2) of the second step, marking of the relative circumferential position of the adapting rings AJR with respect to one another in the joining position takes place.

A further optional sub-step b3) provides that, before the integrally joined joining, a removal of the adapting rings AJR from the arrangement between the flange sealing faces FLS takes place. The removal takes place for the purpose of the adapting rings AJR being adhesively bonded together.

In the following third step c), the integrally joined joining of the adapting rings AJR in the joining position takes place.

Finally, in a fourth step d), the final assembly of the two pipe flanges FLG to form a flange connection with the adapting rings AJR arranged between the two flange sealing faces FLS takes place.

The invention claimed is:

1. An arrangement (ARR) for compensation of an offset (OFT) between two pipe flanges (FLG) comprising:
    adapting rings (AJR) which each have a recess (HOL) which extends along an axis (X) and around which a ring material (AMT) extends along a circumferential direction (CDR),
    the adapting rings (AJR) in each case having two bearing faces (CSF),
    the bearing faces (CSF) are planar substantially circularly annular bearing faces (CSF) at least along circular paths which are concentric with respect to the axis (X),
    a cross section of the ring material (AMT) along the circumferential direction (CDR) having a changing axial ring material thickness (ART) in such a way that at least four of the adapting rings (AJR) have a wedge shape with an angular offset (AOF) of the two bearing faces (CSF) with respect to one another,
    wherein the arrangement (ARR) comprises at least four wedge-shaped mutually adjacent adapting rings (AJR).

2. The arrangement (ARR) as claimed in claim 1, wherein a wedge angle (AOS) for the wedge-shaped adapting rings (AJR) is between 0.01° and 6°.

3. The arrangement (ARR) as claimed in claim 1, wherein the wedge-shaped adapting rings (AJR) in each case have a minimum axial ring material thickness (IAR) and having a maximum axial ring material thickness (AAR), and having a mean internal diameter (AID), wherein $0.005<(AAR-IAR)/AID<1.025$.

4. The arrangement (ARR) as claimed in claim 1, wherein the adapting rings (AJR) have a mean external diameter (AOD) and a mean internal diameter (AID), having a ratio of $1.002<AOD/AID<1.2$.

5. The arrangement (ARR) as claimed in claim 1, wherein at least some of the adapting rings (AJR) are connected among one another in an integrally joined manner.

6. The arrangement (ARR) as claimed in claim 1, wherein the arrangement comprises two flanges (FLG), wherein the flanges (FLG) lie substantially opposite one another with a flange sealing face (FLS), wherein the flange sealing faces (FLS) have an angular offset (AML) between 0.01° and 6° with respect to one another,
    wherein the flanges (FLG) are at an axial spacing (ADS), where ADS>1 mm,
    wherein at least four adapting rings (AJR) are arranged between the two flange sealing faces (FLS) of the two flanges (FLG),
    wherein the at least four adapting rings (AJR) are arranged such that they are turned about the axis (X) with respect to one another in such a way that the axial spacing (ADS) and the angular offset (AML) are filled by the adapting rings (AJR) in a bridging manner.

7. The arrangement (ARR) as claimed in claim 5, wherein all of the adapting rings (AJR) are connected among one another in an integrally joined manner.

8. The arrangement (ARR) as claimed in claim 5, wherein the adapting rings (AJR) are connected among one another in an integrally joined manner by an adhesive bond (GLU).

9. A method for compensating for an offset (OFT) between two pipe flanges (FLG), comprising flange sealing faces (FLS), using an arrangement as claimed in claim 1, the method comprising:
    a) orienting of the pipe flanges (FLG) with at least four adapting rings (AJR) which are arranged between the flange sealing faces (FLS),
    b) turning of the adapting rings (AJR) about the axis (X) with respect to one another into a joining position in such a way that those bearing faces of the adapting rings (AJR) which lie directly opposite the flange sealing faces (FLS) are oriented substantially parallel to the respective opposite flange sealing face (FLS), and the adapting rings (AJR) which are arranged in each case adjacently with respect to the flange sealing faces (FLS) are arranged with the recess (HOL) which extends along the axis (X) in each case substantially concentrically with respect to the adjacent pipe flange (FLG), c) integrally joined joining of the adapting rings (AJR) in the joining position, d) final assembling of the two pipe flanges (FLG) to form a flange connection with the adapting rings (AJR) arranged between the two flange sealing faces (FLS).

10. The method as claimed in claim 9, wherein the following step takes place after the turning and before the integrally joined joining:

B1) checking for the absence of stress of the arrangement (ARR) with the adapting rings (AJR).

11. The method as claimed in claim 9, wherein the following step takes place after the turning and before the integrally joined joining:

b2) marking a relative circumferential position of the adapting rings (AJR) with respect to one another in the joining position.

12. The method as claimed in claim 9, wherein the following step takes place after the turning and before the integrally joined joining:

b3) removing of the adapting rings (AJR) out of the arrangement between the flange sealing faces (FLS).

\* \* \* \* \*